Patented May 20, 1941

2,242,321

UNITED STATES PATENT OFFICE 2,242,321

PRODUCTION OF NONKNOCKING MOTOR FUELS

Mathias Pier, Heidelberg, and Gerhard Free, Ludwigshafen-on-the-Rhine, Germany, assignors, by mesne assignments, to William Ellyson Currie, New York, N. Y.

No Drawing. Application August 24, 1939, Serial No. 291,670. In Germany August 31, 1938

11 Claims. (Cl. 196—50)

The present invention relates to improvements in the production of nonknocking motor fuels.

Hydrocarbons which have been prepared by the reaction of carbon monoxide with hydrogen, when cracked, lead to undesirably large amounts of gaseous hydrocarbons and to liquid products so rich in constituents boiling below 100° C., as for example containing 50 per cent and more thereof, that they do not satisfy the requirements placed on benzine.

We have now found that hydrocarbons obtained from carbon monoxide by reaction with hydrogen can be cracked without the said drawback by subjecting them to the thermal treatment together with a paraffin-base petroleum or fractions of the same. For this purpose a mixture, in particular one having a medium boiling range, and advantageously containing from 10 to 50 per cent of petroleum constituents, is heated to temperatures of from 400° to 650° C. in the presence of catalysts, as for example natural or artificially made aluminium silicates or alumina, advantageously in admixture with metals, such as chromium, molybdenum, tungsten or manganese, or their oxides, or in the presence of these oxides alone (singly or in admixture), or of magnesia, zinc oxide or active carbon. The time of contact between catalyst and initial materials should be short, as for example 0.2 to 5 seconds. The catalyst is regenerated at comparatively short intervals of time, as for example after use for from 0.5 to 2 hours, with gases containing oxygen, preferably having a gradually increasing oxygen content, and advantageously also at increasing temperature, and then used again, if desired in admixture with fresh catalyst. The regeneration is preferably carried to only such an extent that the cracking action of the catalyst is somewhat less than its original action because the use of such a catalyst contributes in avoiding the formation of undesirable, very low-boiling or gaseous products very effectively.

The thermal treatment may be carried out at atmospheric or increased pressure, as for example 50 to 70 atmospheres or more, if desired in the presence of gases, as for example hydrogen. In the latter case, the cracking period, before regeneration of catalyst becomes necessary, may be lengthened.

It has already been proposed to crack hydrocarbons obtained from carbon monoxide by reaction with hydrogen, in admixture with tars or similar oils poor in hydrogen in order to obtain nonknocking benzines. According to our invention the same result is obtained by the co-employment of oils rich in hydrogen while at the same time the formation of gaseous or very low-boiling products is suppressed.

The following example will further illustrate the nature of this invention but the invention is not restricted to this example.

Example

A mixture consisting of 60 per cent of a hydrocarbon fraction boiling between 210° and 360° C. and obtained by reduction of carbon monoxide and of 40 per cent of a paraffin-base petroleum middle oil of the same or a similar boiling range is led at 450° C. over a catalyst composed of silica and alumina. The throughput of oil amounts to 100 parts of oil mixture per 100 parts by volume of catalyst hourly. A product is obtained containing 30 per cent by volume of benzine boiling up to 200° C. There are also obtained 5 per cent of readily liquefiable gaseous hydrocarbons and 1.5 per cent of noncondensable gases. The benzine distilled off from the reaction product contains 40 per cent of constituents boiling up to 100° C. and has an octane number of 70.

If the two components of the oil mixture be treated separately under the said conditions products are obtained containing in both cases 30 per cent by volume of benzine boiling up to 200° C. These benzines contain 55 per cent and 25 per cent respectively of constituents boiling up to 100° C. and after mixing have an octane number of 65. Furthermore when working up the oils separately, the formation of gas is considerably higher.

What we claim is:

1. A process for the production of nonknocking motor fuels which consists in catalytically cracking hydrocarbons obtained from carbon monoxide by reaction with hydrogen, mixed with a paraffin-base petroleum oil.

2. The process according to claim 1 which comprises using as initial material a mixture of hydrocarbons obtained from carbon monoxide by reaction with hydrogen with a fraction of a paraffin-base petroleum.

3. The process according to claim 1 which comprises using as initial material a mixture of hydrocarbons obtained from carbon monoxide by reaction with hydrogen having a middle oil boiling range with a paraffin-base middle oil.

4. The process according to claim 1 which comprises using as initial material a mixture of the said components in which the amount of petroleum constituents is from 10 to 50 per cent.

5. The process according to claim 1 which comprises carrying out the said catalytic cracking at a pressure above 50 atmospheres.

6. The process according to claim 1 which comprises carrying out the said catalytic cracking in the presence of hydrogen.

7. The process according to claim 1 which comprises carrying out the said catalytic cracking in the presence of hydrogen at a pressure above 50 atmospheres.

8. The process according to claim 1 which comprises carrying out the said catalytic cracking the time of contact between catalyst and initial material being short.

9. The process according to claim 1 which comprises carrying out the said catalytic cracking the time of contact between catalyst and initial material being between 0.2 and 5 seconds.

10. In the process according to claim 1 the further step of regenerating the catalyst after use for 0.5 to 2 hours for the cracking process with gases containing oxygen only to such an extent that the cracking action of the catalyst is less than its original action.

11. The process according to claim 1 which comprises catalytically cracking the said initial mixture the time of contact between catalyst and initial material being between 0.2 and 5 seconds and regenerating the catalyst after use for 0.5 to 2 hours for the cracking process with gases containing oxygen only to such an extent that the cracking action of the catalyst is less than its original action.

MATHIAS PIER.
GERHARD FREE.